(12) United States Patent
Kendrick et al.

(10) Patent No.: US 12,050,341 B2
(45) Date of Patent: Jul. 30, 2024

(54) PHOTONIC INTEGRATED CIRCUIT DISTANCE MEASURING INTERFEROMETER

(71) Applicant: RAYTHEON COMPANY, Waltham, MA (US)

(72) Inventors: Richard Lee Kendrick, San Mateo, CA (US); Joseph Marron, Manhattan Beach, CA (US)

(73) Assignee: Raytheon Company, Tewksbury, MA (US)

( * ) Notice: Subject to any disclaimer, the term of this patent is extended or adjusted under 35 U.S.C. 154(b) by 354 days.

(21) Appl. No.: 16/929,907

(22) Filed: Jul. 15, 2020

(65) Prior Publication Data
US 2022/0019019 A1      Jan. 20, 2022

(51) Int. Cl.
*G02B 6/12*      (2006.01)
*G02B 6/124*      (2006.01)

(52) U.S. Cl.
CPC ..... *G02B 6/12004* (2013.01); *G02B 6/12019* (2013.01); *G02B 6/124* (2013.01);
(Continued)

(58) Field of Classification Search
CPC ............ G01B 2290/60; G01B 9/02051; G02B 6/12004; G02B 6/12019; G02B 6/124;
(Continued)

(56) References Cited

U.S. PATENT DOCUMENTS 6,947,621 B2    9/2005    Bell, Jr. et al.
7,003,186 B2    2/2006    Bell, Jr. et al.
(Continued)

FOREIGN PATENT DOCUMENTS

CA      3089801 A1    8/2019
EP      3106828 A1    12/2016

OTHER PUBLICATIONS

Imran Akca, B., et al., "Toward Spectral-Domain Optical Coherence Tomography on a Chip," IEEE Journal of Selected Topics in Quantum Electronics, (2012), vol. 18, No. 3, pp. 1223-1233.
(Continued)

*Primary Examiner* — Ryan A Lepisto
*Assistant Examiner* — Erin D Chiem

(57) ABSTRACT

A digital measuring device implemented on a photonic integrated circuit, the digital measuring device including a laser source implemented on the photonic integrated circuit configured to provide light, a first waveguide structure implemented on the photonic integrated circuit configured to direct a first portion of light from the laser source at a moving object and receive light reflected from the moving object, a second waveguide structure implemented on the photonic integrated circuit configured to combine a second portion of light from the laser source with the light reflected from the moving object to produce a measurement beam, a first multiplexer implemented on the photonic integrated circuit configured to split the measurement beam into a plurality of channels, and a plurality of detectors implemented on the photonic integrated circuit configured to detect an intensity value of each channel to measure a distance between the digital measuring device and the moving object.

20 Claims, 11 Drawing Sheets

(52) U.S. Cl.
CPC .............. *G02B 2006/12104* (2013.01); *G02B 2006/12121* (2013.01); *G02B 2006/12164* (2013.01)

(58) Field of Classification Search
CPC ........... G02B 2006/12104; G02B 2006/12121; G02B 2006/12164
See application file for complete search history.

(56) References Cited

U.S. PATENT DOCUMENTS

| | | | |
|---|---|---|---|
| 8,873,125 B2* | 10/2014 | Saadany | G01B 7/08 359/223.1 |
| 9,816,840 B2 | 11/2017 | Roach et al. | |
| 10,168,137 B2 | 1/2019 | Martinez et al. | |
| 11,221,204 B1 | 1/2022 | Kendrick et al. | |
| 2005/0190371 A1 | 9/2005 | Knuttel | |
| 2014/0085633 A1 | 3/2014 | Preston et al. | |
| 2014/0376000 A1 | 12/2014 | Swanson et al. | |
| 2019/0064358 A1 | 2/2019 | Desai et al. | |
| 2020/0166328 A1* | 5/2020 | Zhou | G01B 9/02091 |
| 2020/0301071 A1* | 9/2020 | Nagarajan | H01S 5/1032 |
| 2020/0363178 A1 | 11/2020 | Teig et al. | |
| 2020/0363187 A1 | 11/2020 | Haverkamp | |
| 2021/0026223 A1 | 1/2021 | Stern et al. | |
| 2021/0124024 A1 | 4/2021 | Sarkissian et al. | |

OTHER PUBLICATIONS

International Search Report and Written Opinion in International Patent Application No. PCT/US2021/038118 dated Nov. 30, 2021.
International Search Report and Written Opinion in International Patent Application No. PCT/US2021/045214 dated Nov. 10, 2021.
International Search Report and Written Opinion in International Patent Application No. PCT/US2021/045378 dated Nov. 10, 2021.
Invitation to Pay Additional Fees and Communication regarding Partial Search Results in International Patent Application No. PCT/US2021/038118 dated Oct. 8, 2021.
Riemensberger, J., et al., "Massively parallel coherent laser ranging using a soliton microcomb," Nature, (2020), vol. 581, No. 7807, pp. 164-170.
Weimann, C., et al., "Silicon photonic integrated circuit for fast and precise dual-comb distance metrology," Optics Express, (2017), vol. 25, No. 24, pp. 30091-30104.

* cited by examiner

PHOTONIC INTEGRATED CIRCUIT DISTANCE MEASURING INTERFEROMETER

BACKGROUND

1. Field

Embodiments of the disclosure relate generally to photonic integrated circuits (IC) and more particularly photonic ICs configured as digital measuring devices.

2. Discussion of Related Art

As is known in the art, non-contact position sensors can be used to provide position measurements in a variety of applications. Some types of non-contact position sensors utilize electromagnetic fields and/or currents to determine the position of targets/objects. In many cases, such position sensors provide limited angular range and resolution performance. In some cases, free space optical systems can be used as position sensors to provide improved angular range and resolution performance; however, such systems are often too large or heavy for many applications.

SUMMARY

At least one aspect of the present disclosure is directed to a digital measuring device implemented on a photonic integrated circuit. The digital measuring device includes a laser source implemented on the photonic integrated circuit configured to provide light, a first waveguide structure implemented on the photonic integrated circuit configured to direct a first portion of light from the laser source at a moving object and receive light reflected from the moving object, a second waveguide structure implemented on the photonic integrated circuit configured to combine a second portion of light from the laser source with the light reflected from the moving object to produce a measurement beam, a first multiplexer implemented on the photonic integrated circuit configured to split the measurement beam into a plurality of channels spaced in frequency, and a first plurality of detectors implemented on the photonic integrated circuit configured to detect an intensity value of each channel of the plurality of channels to measure a distance between the digital measuring device and the moving object.

In one embodiment, the intensity values detected by the plurality of detectors are provided to a controller configured to measure the distance between the digital measuring device and the moving object. In some embodiments, the first waveguide structure, the second waveguide structure, the first multiplexer, and the first plurality of detectors are configured as a Michelson interferometer.

In certain embodiments, the laser source and the first plurality of detectors are disposed on a first substrate of the photonic integrated circuit. In one embodiment, the first substrate is an Indium Phosphide (InP) substrate. In various embodiments, the first waveguide structure, the second waveguide structure, and the first multiplexer are integrated with the laser source and the first plurality of detectors on the first substrate. In some embodiments, the first waveguide structure, the second waveguide structure, and the first multiplexer are integrated on a second substrate of the photonic integrated circuit. In one embodiment, the second substrate is a Silicon Nitride (SiN) substrate.

In some embodiments, an edge of the first substrate is coupled to an edge of the second substrate. In certain embodiments, light is directed between the first and second substrates via one or more mirrors included in the edges of the first and second substrates.

In one embodiment, the digital measuring device includes a third waveguide structure implemented on the photonic integrated circuit configured to receive and reflect a third portion of light from the laser source, a fourth waveguide structure implemented on the photonic integrated circuit configured to receive and reflect a fourth portion of light from the laser source that combines with the reflected third portion of light to produce a calibration beam, a second multiplexer configured to split the calibration beam into a second plurality of channels spaced in frequency, and a second plurality of detectors implemented on the photonic integrated circuit configured to measure an intensity value of each channel of the second plurality of channels.

In certain embodiments, a length of the third waveguide structure and/or the fourth waveguide structure corresponds to a reference distance. In some embodiments, the intensity values measured by the second plurality of detectors are used to calibrate the digital measuring device.

Another aspect of the present disclosure is directed to a fast steering mirror assembly including a mirror, a base including one or more actuators connected to the mirror, the actuators being configured to adjust a position of the mirror, and at least one digital measuring device positioned on the base and configured to monitor the position of the mirror, the at least one digital measuring device including a laser source and at least one interferometer implemented on a photonic integrated circuit.

In one embodiment, the laser source and the at least one interferometer are integrated on a common substrate of the photonic integrated circuit. In some embodiments, the laser source and a first portion of the at least one interferometer are disposed on a first substrate of the photonic integrated circuit and a second portion of the at least one interferometer is disposed on a second substrate of the photonic integrated circuit.

In certain embodiments, the mirror includes one or more reflectors configured to reflect light from the at least one distance measuring device. In various embodiments, the at least one interferometer includes a first waveguide structure configured to direct a first portion of light from the laser source to the one or more reflectors and receive light reflected from the one or more reflectors. In one embodiment, the at least one interferometer includes a second waveguide structure configured to combine a second portion of light from the laser source with the light reflected from the one or more reflectors to produce a measurement beam and a first multiplexer configured to split the measurement beam into a plurality of channels spaced in frequency.

In some embodiments, the at least one interferometer includes a plurality of detectors configured to detect an intensity value of each channel of the plurality of channels to measure a distance between the at least one digital measuring device and the mirror. In certain embodiments, the measured distance between the at least one digital measuring device and the mirror is used to determine the position of the mirror.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

As discussed above, non-contact position sensors can be used to provide position measurements in a variety of applications. Some types of non-contact position sensors utilize electromagnetic fields and/or currents to determine position measurements of targets/objects. For example, one or more eddy current sensors can be configured as a non-contact position sensor to monitor the position of an object. The one or more eddy current sensors are configured to sense currents corresponding to movement of the object to determine position measurements. While these types of non-contact position sensors can provide acceptable position monitoring for some applications, in many cases the performance of such sensors is inadequate. For example, the position measurement range of typical eddy current sensors may be limited to an angular range of ±2 degrees with a resolution of 200 nanoradians.

In some cases, different types of non-contact position sensors can be utilized to provide improved performance. For example, a free space optical system may be configured as non-contact position sensor to provide a larger angular range with improved resolution; however, typical free space optical systems are too large or heavy for many applications (e.g., flight and space applications).

Accordingly, an improved, compact non-contact position sensor is provided herein. In at least one embodiment, a multi-wavelength digital measuring device is implemented on a photonic integrated circuit and configured to monitor the position of a moving object. In some examples, the digital measuring device is configured to monitor the position of a mirror included in a fast steering mirror (FSM) assembly.

Figure 1A:
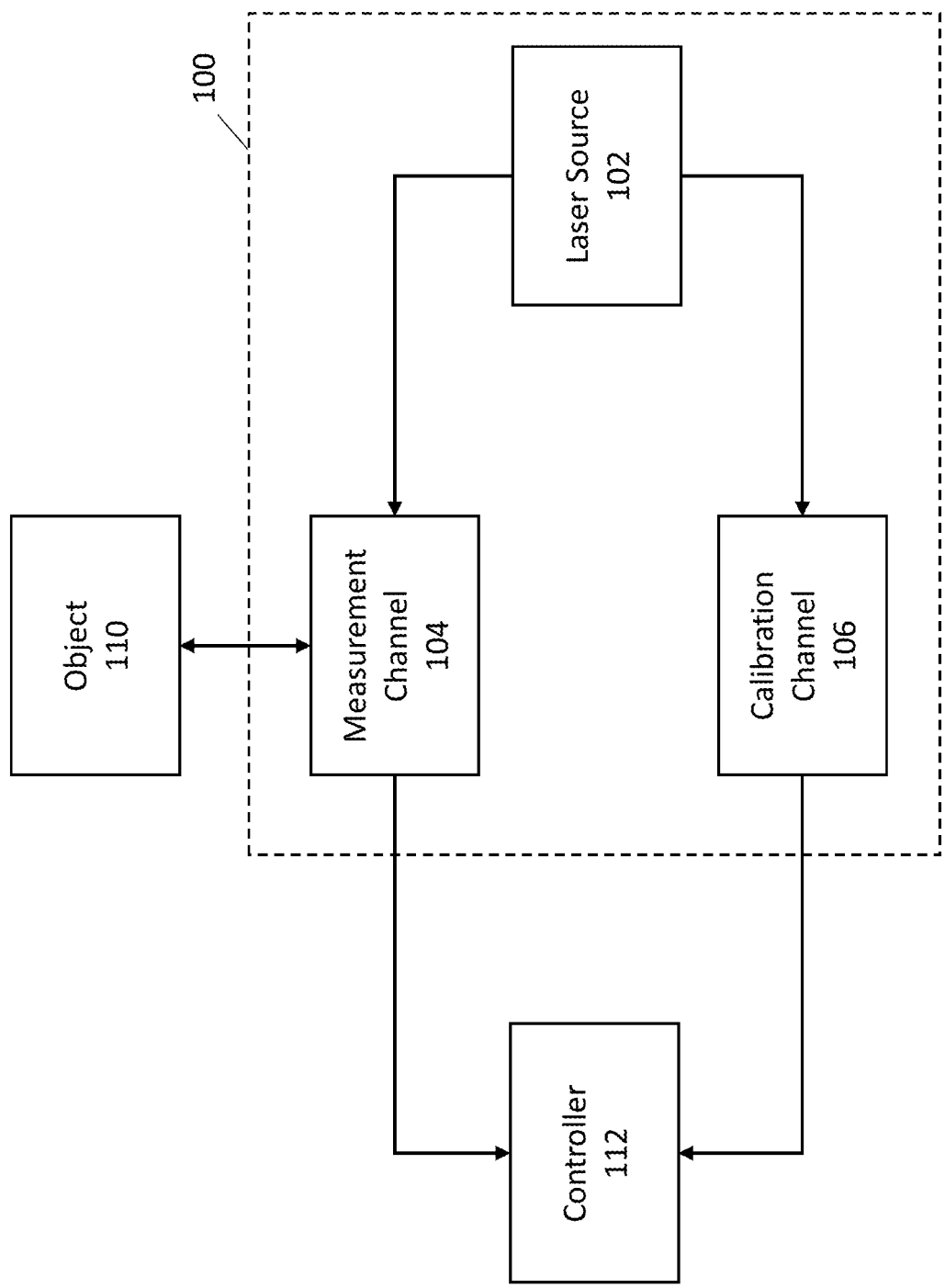
FIG. 1A is a block diagram illustrating a digital measuring device assembly in accordance with aspects described herein.

FIG. 1A illustrates a functional block diagram of a digital measuring device 100 in accordance with aspects described herein. The digital measuring device 100 includes a laser source 102, a measurement channel 104, and a calibration channel 106. As shown, the digital measuring device 100 is configured to monitor the position of a moving object 110. In one example, the measurement channel 104 and the calibration channel 106 are coupled to a controller 112. In some examples, the controller 112 is external to the digital measuring device 100; however, in other examples, the controller 112 may be included in the digital measuring device 100.

In one example, the laser source 102 is multi-wavelength laser diode. In some examples, the laser source 102 is configured to provide light with wavelengths between 30-50 nanometers. In other examples, the laser source 102 may be a different type of laser source and/or configured to provide light having different wavelengths.

In various examples, the controller 112 may include one or more general computing processors, specialized processors, or microcontrollers. The controller 112 may include programmed, special-purpose hardware, for example, an application-specific integrated circuit (ASIC), or more generally designed hardware, such as a field programmable gate array (FPGA) or a general-purpose processor. In one example, the controller 112 may include one or more memory devices, such as a disk drive, memory, flash memory, embedded or on-chip memory, or other device for storing data.

Figure 1B:
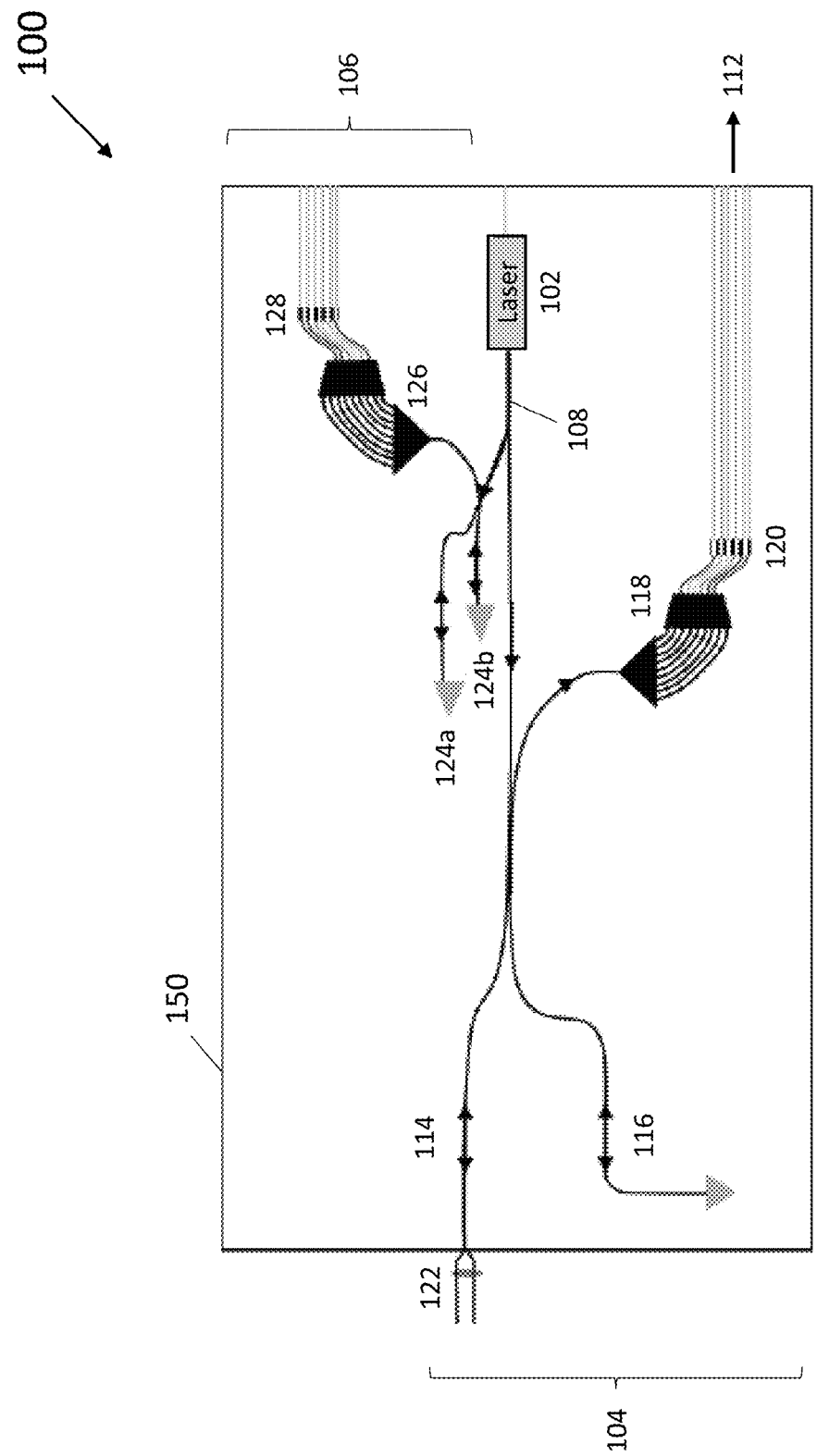
FIG. 1B is a schematic diagram illustrating a digital measuring device in accordance with aspects described herein.

FIG. 1B illustrates a schematic diagram of the digital measuring device 100 in accordance with aspects described herein. As shown, the digital measuring device 100 is implemented on a photonic integrated circuit (PIC) 150. In one example, the PIC 150 includes a single substrate; however, in other examples, the PIC 150 may include two or more substrates, as described in greater detail herein.

As illustrated in FIG. 1B, the laser source 102 is connected to a waveguide structure 108, and the waveguide structure 108 is connected to the measurement channel 104 and the calibration channel 106 to distribute the light provided by the laser source 102. In one example, a first portion of light from the laser source 102 is provided to the measurement channel 104 and a second portion of light from the laser source 102 is provided to the calibration channel 106. For example, the waveguide structure 108 may be configured to divert 90% of the light from the laser source 102 to the measurement channel 104 and the remaining 10% to the calibration channel 106.

In one example, the measurement channel 104 is configured as a Michelson interferometer (homodyne or heterodyne configuration) to provide multi-wavelength distance measurements. The measurement channel 104 includes a measurement arm 114, a reference arm 116, and a first arrayed waveguide grating (AWG) device 118. In some examples, the measurement arm 114 and the reference arm 116 are configured as waveguide structures integrated on the PIC 150 and coupled to the waveguide structure 108.

In one example, the first portion of light from the laser source 102 provided to the measurement channel 104 is split between the measurement arm 114 and the reference arm 116 (e.g., 50:50 split). The measurement arm 114 is coupled to a collimating optic device 122 that directs a beam of light off the PIC 150 towards the moving object 110. In some examples, the moving object 110 includes a first retro device (i.e., reflector) configured to reflect and return the beam to the collimating optic device 122 coupled to the measurement arm 114 on the PIC 150. Likewise, the reference arm 116 includes a second retro device positioned on the PIC 150 and the light provided to the reference arm 116 is reflected by the second retro device and returned to interfere with the measurement arm 114. As such, light from the measurement arm 114 and the reference arm 116 combine to produce a measurement beam, and the measurement beam is provided to the first AWG device 118.

The first AWG device 118 is configured to receive the measurement beam and de-multiplex the measurement beam into a plurality of channels (e.g., 100 channels). In one example, the first AWG device 118 is configured to provide a plurality of channels having a uniform frequency/wavelength spacing; however, in other examples, the first AWG device 118 can be configured with a non-uniform frequency/wavelength spacing. In some examples, the spacing of the plurality of channels is selected to provide a desired ambiguity interval using equation (1) below:

$$\text{Ambiguity Interval} = c/\Delta v_{increment} \quad (1)$$

where, c is the speed of light and $\Delta v_{increment}$ is the minimum frequency separation between channels (i.e., spacing). In one example, the ambiguity interval corresponds to the absolute metrology distance measurement capability of the measurement channel 104 (i.e., the Michelson interferometer). For example, the first AWG device 118 can be configured with a spacing of 20 GHz between channels to provide a measurement capability of ±15 millimeters (mm). In other examples, the first AWG device 118 can be configured to provide different ranges of measurement capability (e.g., 10 mm, 30 mm, etc.). In one example, a 20 GHz channel spacing corresponds to a channel width of approximately 1 Angstrom at a 1.3 micron wavelength. In other examples, the first AWG device 118 may be configured with a different ambiguity interval, channel width, and/or center wavelength. In certain examples, the configuration of the first AWG device 118 corresponds to the capabilities (i.e., frequency range) of the laser source 102.

In one example, the plurality of channels of the first AWG device 118 are connected to a first plurality of detectors 120. For example, each channel of the plurality of channels may be connected a corresponding detector of the first plurality of detectors 120. In some examples, the first plurality of detectors 120 are high speed Indium Phosphide (InP) detectors configured to detect the intensity of each channel (i.e., fringe intensity). In other examples, the first plurality of detectors 120 may be different types of detectors (e.g., Indium Gallium Arsenide (InGaAs)). As shown, the outputs of the first plurality of detectors 120 are provided to the controller 112 for processing to determine the position of the moving object 110.

Similarly, the calibration channel 106 may be configured as a Michelson interferometer (homodyne or heterodyne configuration). In one example, the calibration channel 106 includes a first reference arm 124a, a second reference arm 124b, and a second AWG device 126. In some examples, the first reference arm 124a and the second reference arm 124b are configured as waveguide structures integrated on the PIC 150 and coupled to the waveguide structure 108.

In certain examples, the first and second reference arms 124a, 124b are configured as a National Institute of Standards and Technology (NIST) traceable reference. For example, the reference arm 124a, 124b may be waveguide structures configured with known lengths and/or spacings in accordance with NIST standards.

In some examples, the second portion of light from the laser source 102 provided to the calibration channel 106 is split between the first reference arm 124a and the second reference arm 124b (e.g., 50:50 split). Each of the first and second reference arms 124a, 124b includes a retro device (i.e., reflector) configured to reflect and return the light provided to each arm. In one example, the reflected light from the first and second reference arms 124a, 124b combine to produce a reference beam, and the reference beam is provided to the second AWG device 126. Similar to the first AWG device 118, the second AWG device 126 is configured to de-multiplex the reference beam into a plurality of channels. In one example, the second AWG device 126 has the same configuration as the first AWG device 118; however, in other examples, the second AWG device 126 may be configured differently (e.g., number of channels, separation, etc.).

The plurality of channels of the second AWG device 126 are connected to a second plurality of detectors 128, and the second plurality of detectors 128 are configured to detect the intensity of each channel. In one example, the outputs of the second plurality of detectors 120 are provided to the controller 112. In some examples, the controller 112 is configured to process the recorded intensities of each channel to determine the length of the first measurement arm 124a and/or the second measurement arm 124b. The controller 112 may utilize the measured length(s) of the measurement arms 124a, 124b and the known configuration of the calibration channel 106 (i.e., NIST standard) to determine calibration coefficients or weights for the measurement channel 104. In some examples, the coefficients or weights may correspond to a frequency response of the PIC 150.

Figure 2:
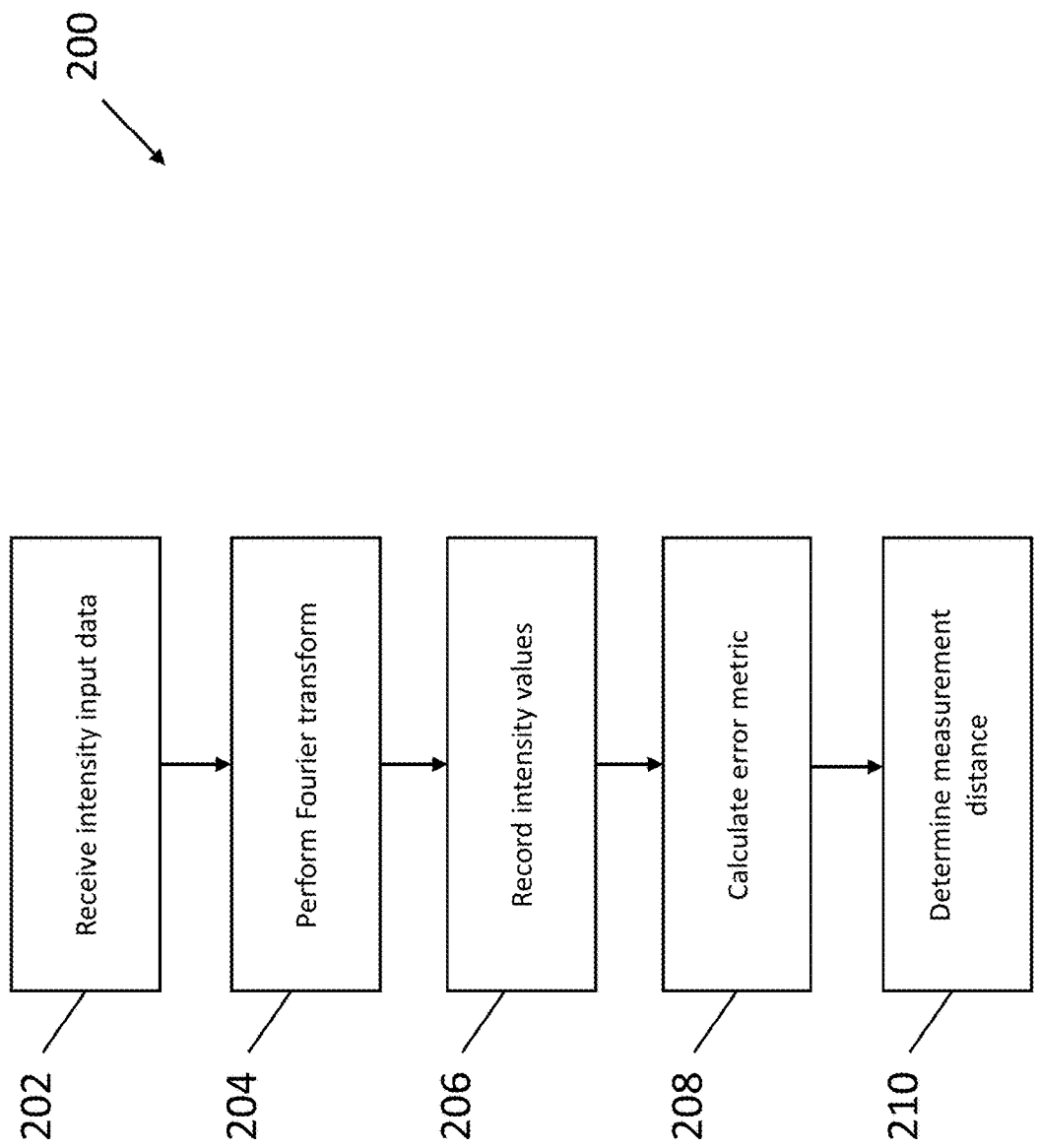
FIG. 2 is a flow diagram illustrating a method of processing intensity data from a digital measuring device in accordance with aspects described herein.

FIG. 2 illustrates a method 200 for processing intensity data from a digital measuring device to monitor the position of a moving object in accordance with aspects described herein. In one example, the method 200 can be used to monitor the position of the moving object 110 using the digital measuring device 100 of FIGS. 1A and 1B.

At block 202, the controller 112 receives measurement intensity data from the first plurality of detectors 120 of the measurement channel 104 and calibration intensity data from the second plurality of detectors 128 of the calibration channel 106.

At block 204, the controller 112 is configured to perform a Fourier transform to convert the received measurement and calibration intensity data into the frequency domain. In one example, in order to perform the Fourier transform, the controller 112 is configured to sample the time domain intensity data using a sample rate corresponding to the wavelength(s) of the light provided by laser source 102. For example, the controller 112 may be configured to sample the intensity data using a 20 kHz sample rate; however, in other examples, the controller 112 may be configured to use a different sample rate (e.g., up to 50 GHz). In some examples, the Fourier transform of the measurement intensity data produces a peak in the frequency domain that increases in frequency as the measurement distance from the moving object 110 increases.

Figure 3A:
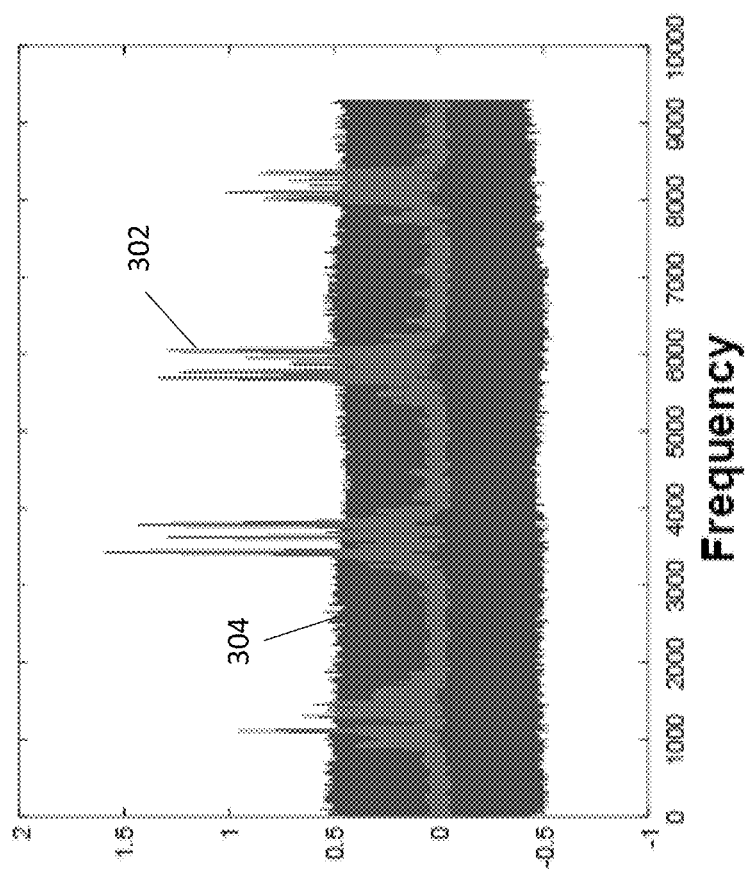
FIG. 3A is a graph illustrating intensity data from a digital measuring device in accordance with aspects described herein.

FIG. 3A illustrates example frequency domain representations of the measurement and calibration intensity data described above. In one example, the measurement signal 302 corresponds to the frequency domain representation of the measurement intensity data. As shown, the measurement signal 302 includes variations in frequency content that correspond to the position of the moving object 110 (i.e., distance from the digital measuring device 100).

Likewise, the calibration signal 304 corresponds to the frequency domain representation of the calibration intensity data. In one example, the calibration signal 304 includes variations in frequency content that correspond to the frequency response of the digital measuring device 100 and/or the PIC 150. As described above, the variations may be used to determine calibration coefficients or weights that can be applied to the measurement signal 302. In some examples, the values of the calibration coefficients are selected such that any non-uniform characteristics or non-linearities inherent to the frequency response of the digital measuring device 100 and/or PIC 150 are accounted for in the measurement intensity data (i.e., the measurement signal 302).

In certain examples, the controller 112 is configured to calculate and apply the calibration coefficients at a pre-determined or adjustable time interval. For example, the controller 112 may be configured to periodically update the calibration coefficients to account for environmental changes (e.g., temperature, altitude, etc.) and operational characteristics of the digital measuring device 100 (e.g., thermal profile). In other examples, the controller 112 can be configured to update the calibration coefficients corresponding to one or more specific events (e.g., power on, post-fabrication testing, etc.).

In some examples, the measurement signal 302 is used to determine an initial distance estimate. For example, the peak amplitude and/or frequency of the measurement signal 302 may be compared to a reference amplitude and/or frequency corresponding to a known reference distance. In some examples, the known reference distance may be the reference arm 116 of the measurement channel 104 or the length of the first or second reference arms 124a, 124b of the calibration channel 106. In other examples, the measurement signal 302 may be compared to one or more pre-determined reference distances stored by the controller 112 (i.e., in memory).

At block 206, the controller 112 records the intensity values for each channel from the Fourier transform output. In one example, the intensity value of each channel is a fringe intensity value at a particular phase. As such, the intensity values may change as a function of wavelength, providing a sinusoidal signal (i.e., the measurement signal 302) across the plurality of channels representing the measurement distance. In some examples, the sinusoidal signal across the plurality of channels corresponds to an intensity pattern. In certain examples, each distance value within the ambiguity interval of the distance measuring device (e.g., 15 mm) may correspond to a unique intensity pattern.

Figure 3B:
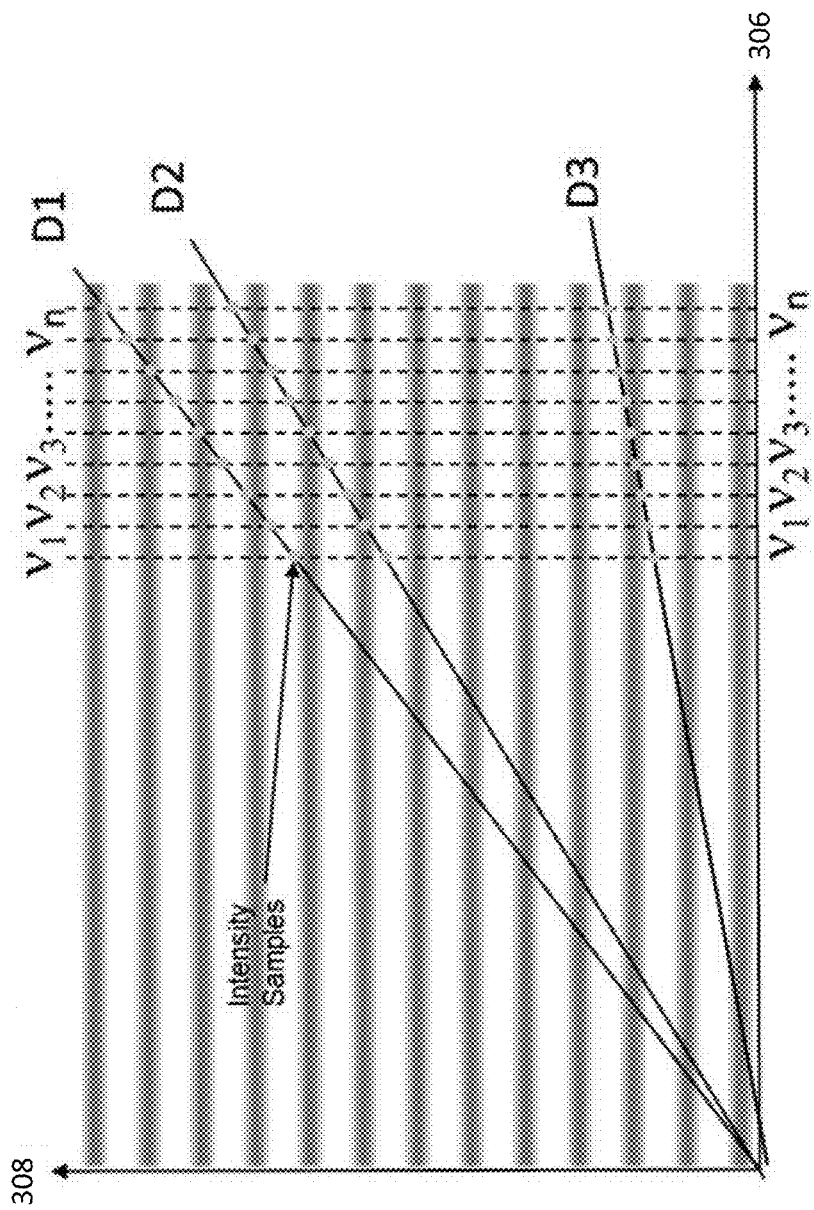
FIG. 3B is a graph illustrating intensity patterns from a digital measuring device in accordance with aspects described herein.

FIG. 3B illustrates examples of intensity patterns for a first distance D1, a second distance D2, and a third distance D3. In one example, the first distance D1 is the longest distance and D3 is the shortest distance. The horizontal axis 306 represents frequency and the vertical axis 308 represents intensity. Likewise, the alternating dark and light horizontal bars indicate phase. As shown, the intensity values can be recorded for each frequency/channel ($v_n$) to produce unique intensity patterns corresponding to each of the distances D1-D3.

At block 208, the recorded intensity values are correlated to calculated sinusoidal intensity values to determine a final distance estimate. In one example, the intensity values are correlated using an error metric given by equation (2) below:

$$E(D') = \frac{\sum_{n=1}^{N} I_n \cos\left(\frac{4\pi}{c} d'v_n\right)}{\sqrt{\sum_{n=1}^{N} I_n^2} \sqrt{\sum_{n=1}^{N} \cos^2\left(\frac{4\pi}{c} D'v_n\right)}} \quad (2)$$

where, N is the total number of channels (e.g., 100), $v_n$ is the frequency of each channel, $I_n$ is the measured/recorded intensity value of each channel, and D' is a distance value. The calculated sinusoidal intensity values are represented by the cosine term in the numerator.

In one example, equation (2) can be solved iteratively by substituting in a plurality of distance values for D' to produce an error distribution over a distance range. The step size between each of the plurality of distance values may correspond to the configuration of the digital measuring device 100 (e.g., ambiguity interval, number of channels, etc.). In some examples, a high-resolution step size corresponding to the configuration of the digital measuring device 100 is used to provide an error distribution with nanometer precision. In certain examples, the error distribution can be interpolated between distance values to provide even higher resolutions.

In some examples, the error distribution is calculated over a distance value range corresponding to the full measurement range of the digital measuring device 100. In other examples, the error distribution is calculated over a subset of the full measurement range. For example, the controller 112 may be configured to calculate the error distribution over an optimized (i.e., narrower) distance value range corresponding to the initial distance estimate (block 204). In some examples, calculating the error distribution over the optimized distance value range can reduce processing time and calculational complexity.

Figure 3C:
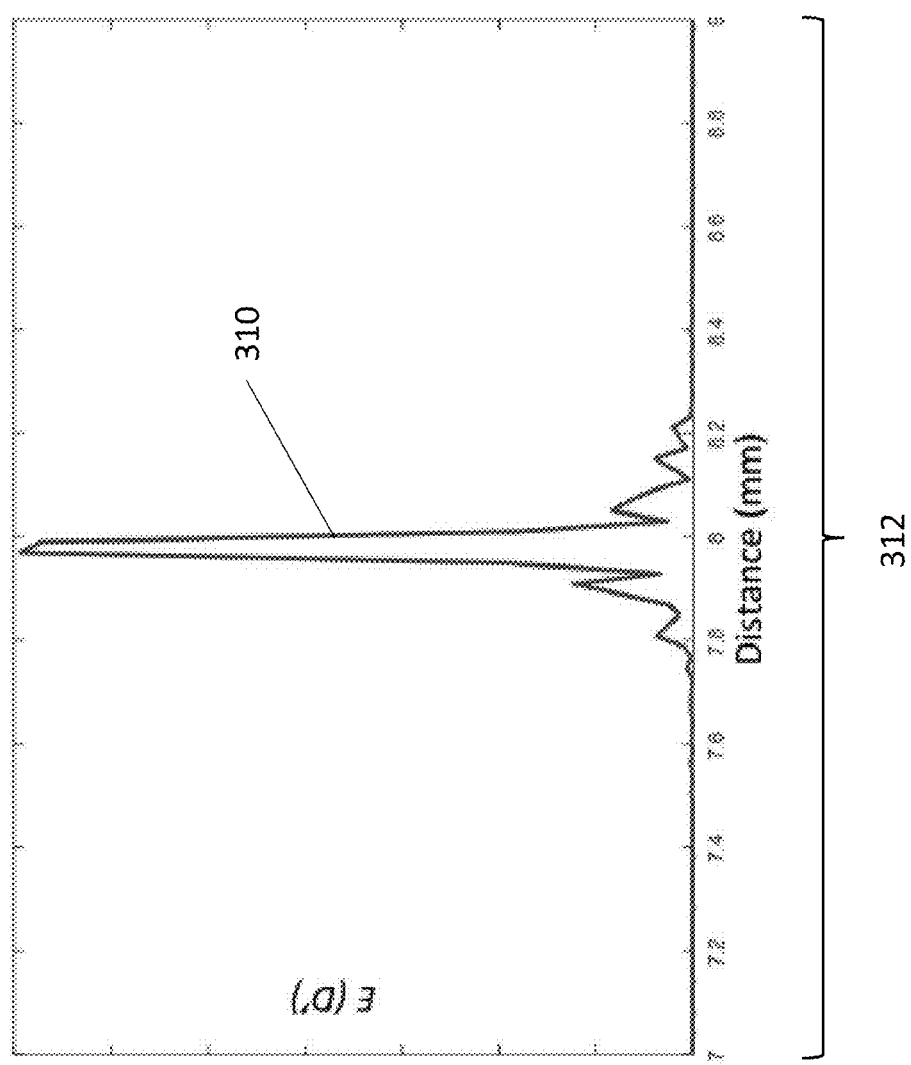
FIG. 3C is a graph illustrating an error distribution corresponding to intensity data from a digital measuring device in accordance with aspects described herein.

FIG. 3C illustrates an example error distribution 310 in accordance with aspects described herein. In one example, the error distribution 310 is calculated over an optimized distance value range 312. As shown, the optimized distance value range 312 spans from 7 mm to 9 mm and may correspond to an initial distance estimate of 8 mm. As described above, in other examples, the error distribution 310 may be calculated over the full measurement range of the digital measuring device 100 (e.g., 0 mm to 15 mm).

Figure 3D:
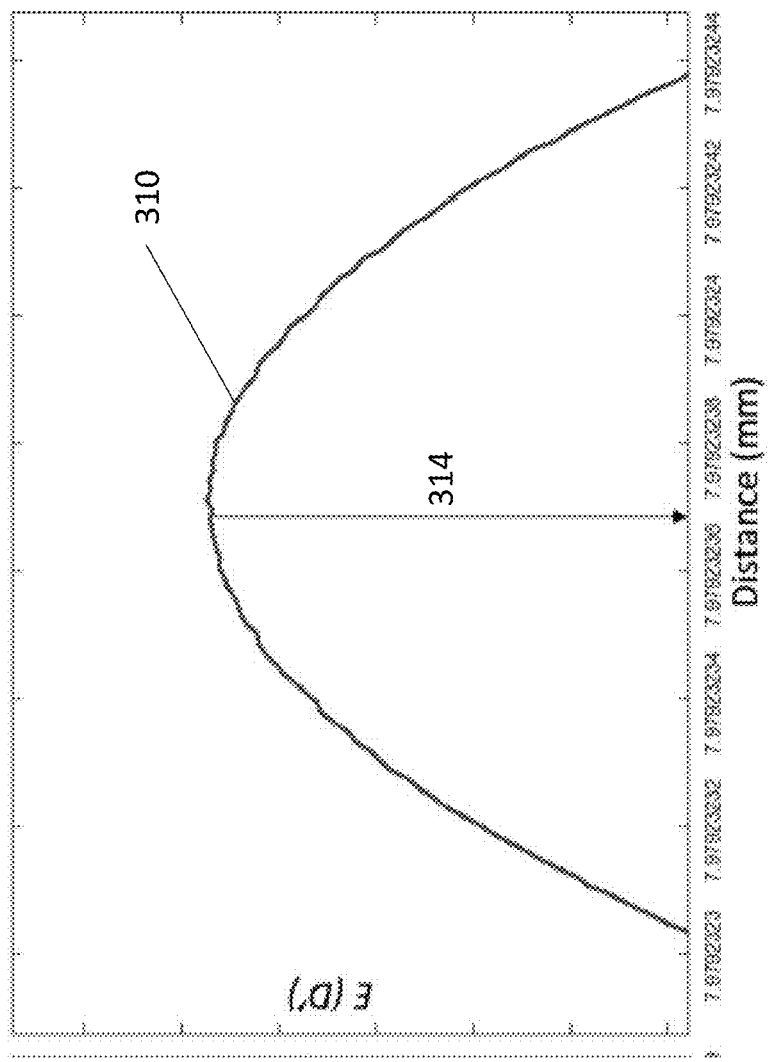
FIG. 3D is a graph illustrating the peak of an error distribution corresponding to intensity data from a digital measuring device in accordance with aspects described herein.

At block 210, the calculated error distribution is analyzed to determine the final distance estimate. In some examples, the final distance estimate is determined based on the peak of the calculated error distribution. FIG. 3D illustrates a close-up view of the peak of the error distribution 310. As shown, the peak of the error distribution 310 can be utilized to determine the final distance estimate (indicated at 314) with nanometer precision.

In some examples, the method 200 is repeated to monitor the position of the moving object 110 in real-time. For example, the controller 112 may be configured to continuously receive measurement intensity data from the digital measuring device 100 and re-calculate distance estimates indicating the position of the moving object 110 relative to the digital measuring device 100.

In one example, the digital measuring device 100 is configured to operate over a larger angular range with a higher resolution compared to other types of non-contact position sensors (e.g., current-based sensors). For example, the digital measuring device 100 may provide an angular range of ±5 degrees with a resolution of 10 nanoradians. As such, the digital measuring device 100 can provide significant performance improvements (e.g., 10×) compared to other types of non-contact position sensors.

As described above, the digital measuring device 100 is implemented on the PIC 150. In one example, the PIC 150 corresponds to a single Indium Phosphide (InP) substrate on which the active and passive components of the digital measuring device 100 are fabricated, integrated, and/or disposed. In other examples, the PIC 150 can include two or more substrates on which the active and passive components of the digital measuring device 100 are fabricated, integrated, and/or disposed.

Figure 4A:
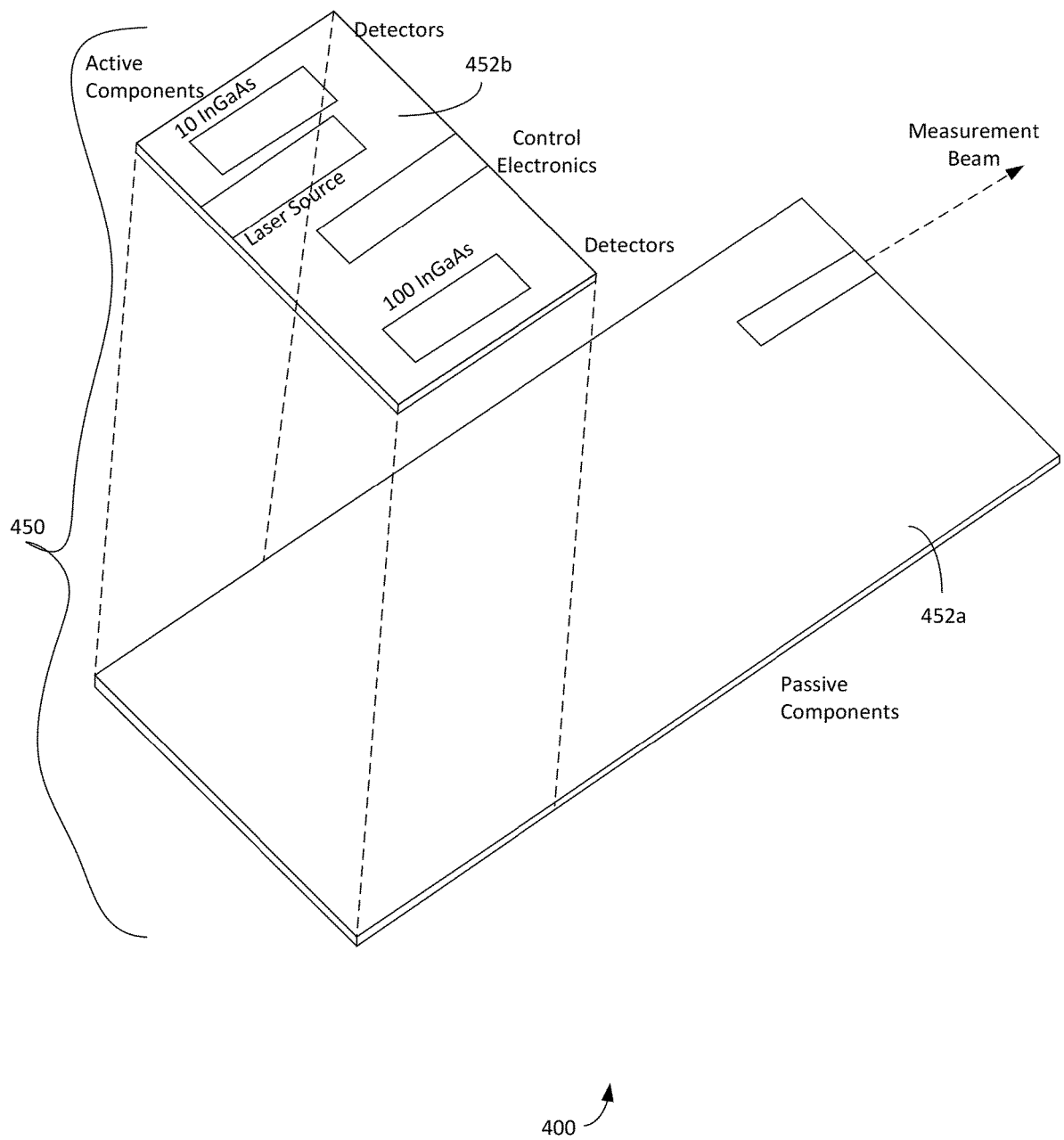
FIG. 4A is a diagram illustrating a digital measuring device in accordance with aspects described herein.

FIG. 4A illustrates a digital measuring device 400 implemented on a photonic integrated circuit including multiple substrates in accordance with aspects described herein. In one example, the digital measuring device 400 corresponding to the digital measuring device 100 of FIGS. 1A and 1B.

As shown, the digital measuring device 400 is implemented on a PIC 450 including a first substrate 452a and a second substrate 452b. In one example, the first substrate 452a is dedicated to passive components (e.g., the measurement channel 104, the calibration channel 106, the waveguide structure 108, etc.). In some examples, the first substrate 452a is made from Silicon Nitride (SiN). As such, the waveguide structures of the passive components can be fabricated (i.e., patterned) on the surface of the first substrate 452a. In other examples, the first substrate may be made from a different material (e.g., Si) and the passive components are defined by patterning a photonic material on the surface of the first substrate 452a.

Likewise, the second substrate 452b may be dedicated to active components (e.g., the laser source 102, the first plurality of detectors 120, the second plurality of detectors 128, etc.). In some examples, the second substrate 452b includes control devices (i.e., the controller 112). In one example, the second substrate 452b is made from InP and the active components are disposed on the surface of the second substrate 452b. In other examples, the second substrate 452b can be made from a different material (e.g., Si).

The first substrate 452a and the second substrate 452b may be coupled together, allowing light to be directed between the passive and active components. In one example, an edge of the first substrate 452a is coupled to an edge of the second substrate 404b. In some examples, the edges are coupled together via angled facets (e.g., 45 degrees) including mirrors configured to direct light between the substrates 452a, 452b. In certain examples, the substrates 452a, 452b can be mounted, attached, and/or bonded to another substrate or platform to provide structural support as needed. In other examples, the second substrate 452b can be mounted, attached, and/or bonded to the surface of the first substrate 452a and one or more mirrors may be used to direct light between the substrates 452a, 452b.

In some examples, being that all components (e.g., active and passive) are contained on a single PIC, the size, weight, and power consumption of the digital measuring device 100 can be reduced. In one example, the dimensions of the PIC 150 are 3.5×7 mm; however, in other examples, the PIC 150 may be configured with different dimensions. As such, the digital measuring device 100 can be advantageously used in applications where a compact, high-performance non-contact position sensor is needed.

Figure 4B:
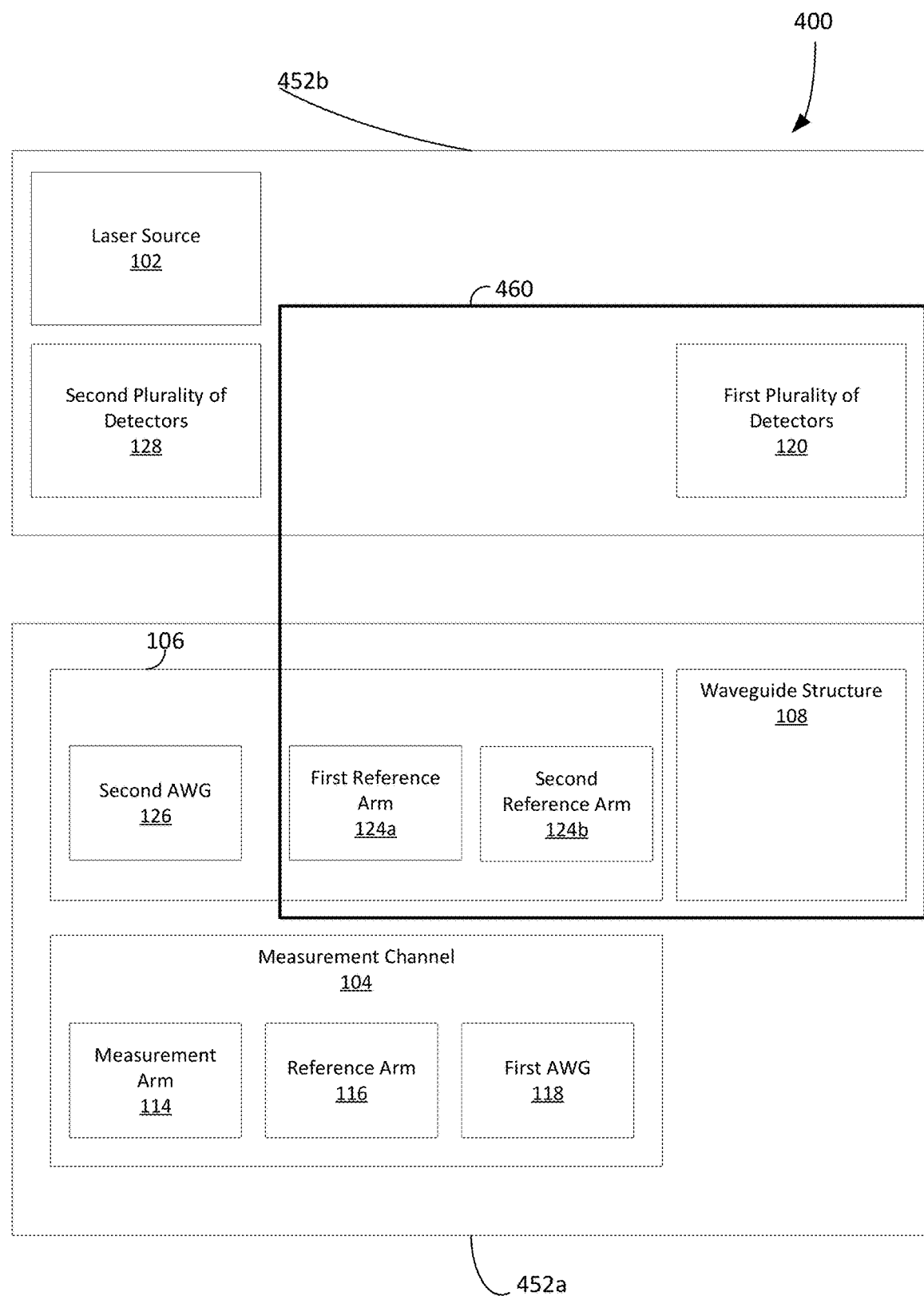
FIG. 4B illustrates a block diagram of a digital measuring device in accordance with aspects described herein.

FIG. 4B illustrates a block diagram of the digital measuring device 400 of FIG. 4A according to an example. Interferometer 460 of FIG. 4B is one example of an interferometer, and may be a Michelson Interferometer.

Figure 5A:
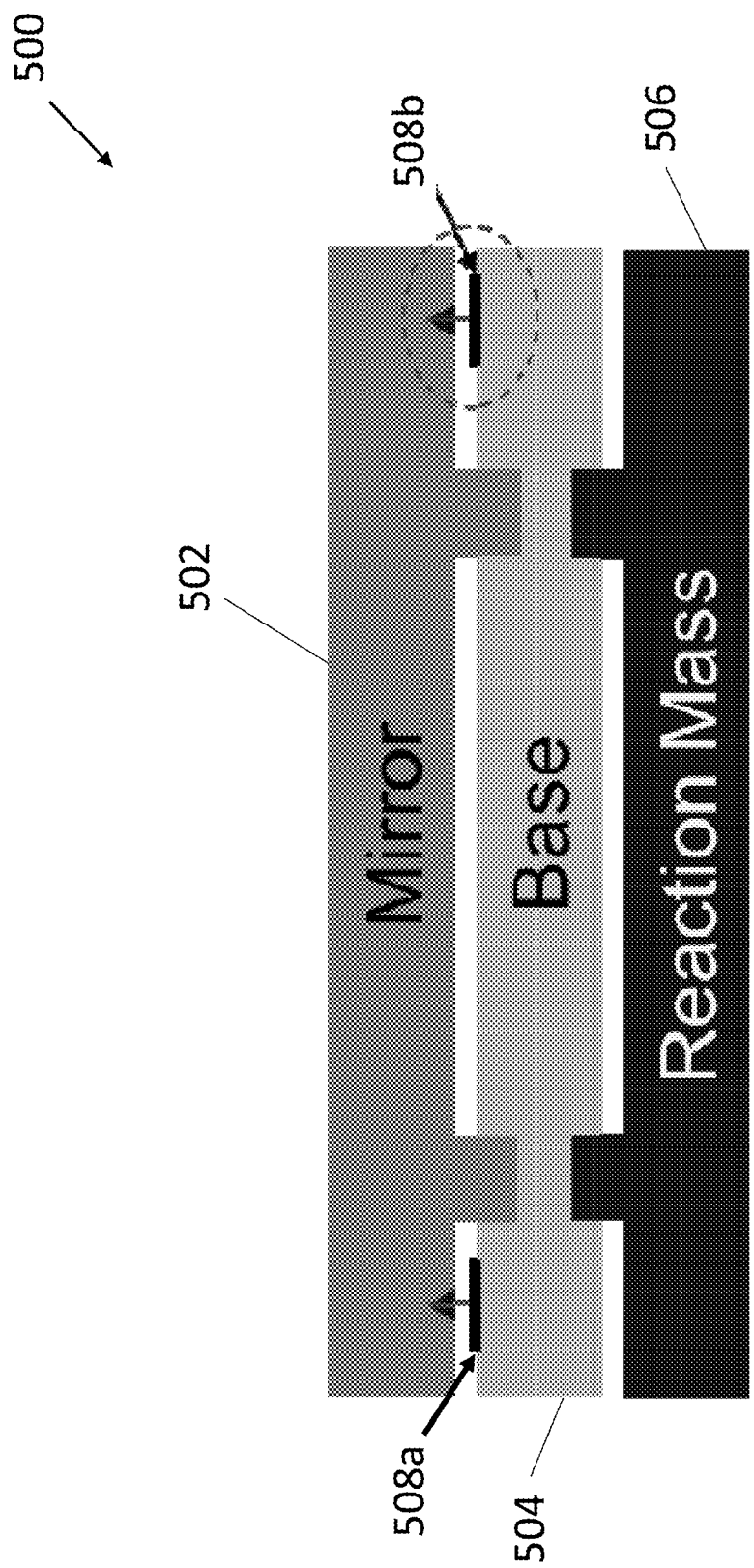
FIG. 5A is a diagram illustrating a fast steering mirror assembly in accordance with aspects described herein.

FIG. 5A illustrates a cross-sectional view of a fast steering mirror (FSM) assembly 500 in accordance with aspects described herein. In one example, the FSM assembly 500 is configured for use in flight/space applications including laser pointing, tracking, and image stabilization. As shown, the FSM assembly 500 includes a mirror 502, a base 504, and a reaction mass 506. In some examples, the base 504 includes one or more actuator components configured to adjust the position and/or angle of the mirror 502. The reaction mass 506 is attached to the base 504 and configured to stabilize the FSM assembly 500 to minimize the effect of disturbances/vibrations.

In one example, the FSM assembly 500 includes a first digital measuring device 508a and a second digital measuring device 508b. In some examples, the digital measuring devices 508a, 508b correspond to the digital measuring device 100. The digital measuring devices 508a, 508b can be mounted and/or attached to the base 504 and configured to monitor the position of the mirror 502. In other examples, the FSM assembly 500 can be configured with a different number of digital measuring device (e.g., 1, 3, etc.) to monitor the position of the mirror 502.

Figure 5B:
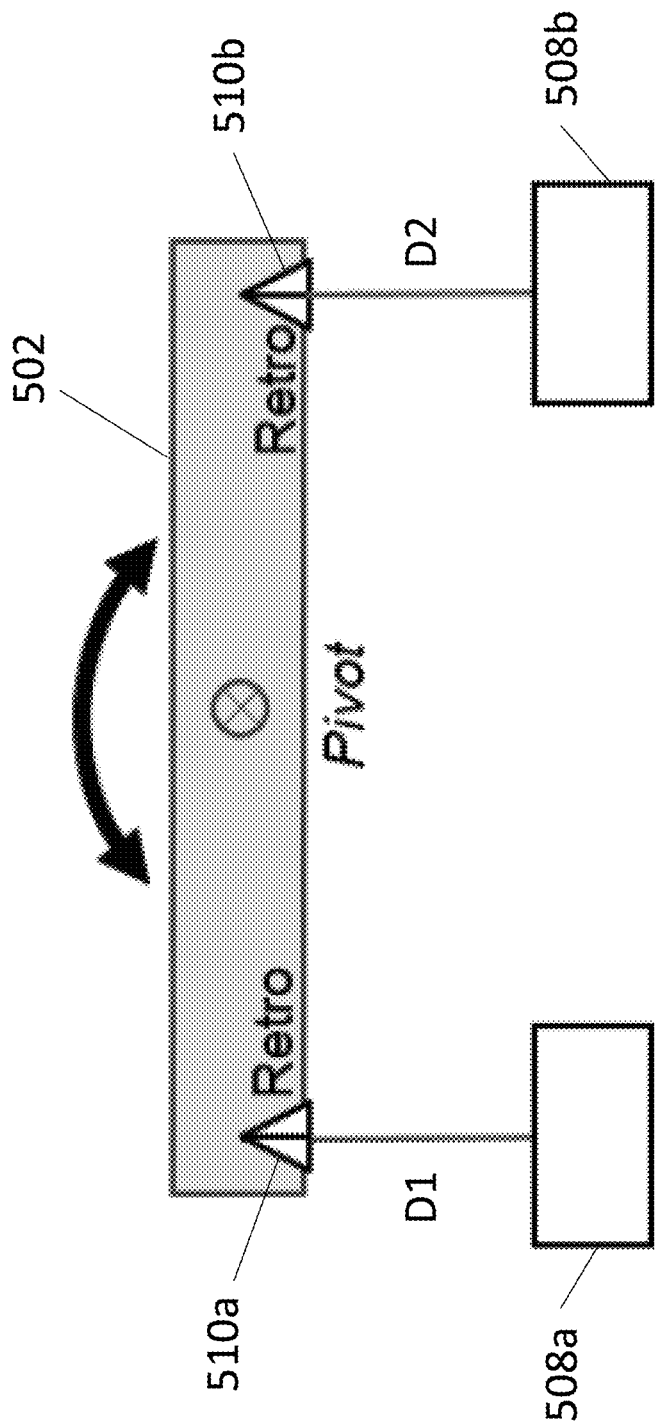
FIG. 5B is a diagram illustrating a fast steering mirror assembly in accordance with aspects described herein.

As shown in FIG. 5B, retro devices (i.e., reflectors) 510a, 510b can be positioned on the back side on the mirror 502 to create measurement paths between the mirror 502 and the digital measuring device 508a, 508b. In some examples, the retro devices 510a, 510b are hollow corner cube reflectors; however, in other examples, the retro devices 510a, 510b may be a different type of reflector (e.g., ball-type cat eye). In one example, the first digital measuring device 508a is configured to measure the distance D1 between itself (or the base 504) and the location of the retro device 510a. Likewise, the second digital measuring device 508b is configured to measure the distance D2 between itself (or the base 504) and the location of the retro device 510b.

In one example, a pair of measurement beams are provided to the retro devices 510a, 510b from the digital measuring devices 508a, 508b. As described above, the measurement beams are then reflected back, and the digital measuring devices 508a, 508b are configured to determine the distance to each of the retro devices 510a, 510b (i.e., D1 and D2). The position/orientation of the mirror 502 can then be derived from the distances between the retro devices 510a, 510b and the digital measuring devices 508a, 508b.

In some examples, by monitoring the position/orientation of the mirror 502, the accuracy of the FSM assembly 500 can be improved. For example, the monitored position of the mirror 502 may be used to verify and/or calibrate the actuated positions of the mirror 502. As described above, the digital measuring devices 508a, 508b are configured to operate over large angular ranges with improved resolution compared to other types of non-contact position sensors. As such, the distance measuring devices 508a, 508b can be used with FSMs that operate with increased angular ranges and/or high precision actuated positioning.

It should be appreciated that embodiments described herein are not limited to a particular type of non-contact position sensing. As described above, the digital measuring device 100 can be included in an FSM assembly to monitor the position of a mirror; however, in other examples, the digital measuring device 100 can be configured to monitor/measure the position of different types of actuated components. In some examples, the digital measuring device 100 can be used in different applications including optical coherence tomography, laser trackers position sensing, coordinate measuring machine position sensing, CNC machine head position sensing, automotive motion and vibration sensing, and fringe sensing for fiber-optic gyroscopes. In certain examples, the digital measuring device 100 can be configured as an active damping sensor and a microphone transducer.

As described above, an improved, compact non-contact position sensor is provided herein. In at least one embodiment, a multi-wavelength digital measuring device is implemented on a photonic integrated circuit and configured to monitor the position of a moving object. In some examples, the digital measuring device is configured to monitor the position of a mirror included in a fast steering mirror (FSM) assembly.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A fast steering mirror assembly comprising:
   a mirror having a front and a back;
   a base including one or more actuators connected to the mirror, the one or more actuators configured to adjust a position and an angle of the mirror;
   first and second digital measuring devices positioned on the base and configured to monitor the position of the mirror, each of the first and second digital measuring devices including a laser source and at least one interferometer implemented on a photonic integrated circuit;
   a first retro device coupled to the back of the mirror and configured to reflect a first measurement beam to the first digital measuring device; and
   a second retro device coupled to the back of the mirror at a set distance from the first retro device and configured to reflect a second measurement beam to the second digital measuring device.

2. The fast steering mirror assembly of claim 1, wherein, in each digital measuring device, the laser source and the at least one interferometer are integrated on a common substrate of the photonic integrated circuit.

3. The fast steering mirror assembly of claim 1, wherein, in each digital measuring device, the laser source and a first portion of the at least one interferometer are disposed on a first substrate of the photonic integrated circuit and a second portion of the at least one interferometer is disposed on a second substrate of the photonic integrated circuit.

4. The fast steering mirror assembly of claim 1 wherein a first distance corresponding to the first measurement beam, a second distance corresponding to the second measurement beam, and a third distance corresponding to the set distance are used to determine at least one of the position or the angle of the mirror.

5. The fast steering mirror assembly of claim 1, wherein, in each digital measuring device, the at least one interferometer includes a first waveguide structure configured to direct a first portion of light from the laser source to one of the first and second retro devices and receive light reflected from the one of the first and second retro devices.

6. The fast steering mirror assembly of claim 5, wherein, in each digital measuring device, the at least one interferometer includes a second waveguide structure configured to combine a second portion of light from the laser source with the light reflected from the one of the first and second retro devices to produce the first or second measurement beam and a demultiplexer configured to split the first or second measurement beam into a plurality of channels spaced in frequency.

7. The fast steering mirror assembly of claim 6, wherein, in each digital measuring device, the at least one interferometer includes a plurality of detectors configured to detect an intensity value of each channel of the plurality of channels to measure a distance between the digital measuring device and the mirror.

8. The fast steering mirror assembly of claim 7, wherein the measured distances between the first and second digital measuring devices and the mirror are used to determine the position of the mirror.

9. A method of steering a fast steering mirror assembly comprising (i) a mirror having a front and a back, (ii) a base including one or more actuators connected to the mirror, (iii) first and second digital measuring devices, (iv) a first retro device coupled to the back of the mirror and configured to reflect a first measurement beam to the first measuring device, and (v) a second retro device coupled to the back of the mirror at a set distance from the first retro device and configured to reflect a second measurement beam to the second digital measuring device, the one or more actuators configured to adjust a position and an angle of the mirror, the method comprising:
   monitoring, via the first and second digital measuring devices, the position of the mirror, the first and second digital measuring devices positioned on the base, each of the first and second digital measuring devices including a laser source and at least one interferometer implemented on a photonic integrated circuit;
   reflecting, via the first retro device, the first measurement beam;
   reflecting, via the second retro device, the second measurement beam; and
   adjusting, via the one or more actuators, the position and the angle of the mirror.

10. The method of claim 9, further comprising providing the mirror assembly with a reaction mass, the method further comprising stabilizing the mirror assembly via the reaction mass to minimize vibrations and other disturbances.

11. The method of claim 9, further comprising providing each of the first and second digital measuring devices with a first waveguide structure, the method further comprising, in each digital measuring device:
   directing, via the first waveguide structure, light from the laser source to one of the first and second retro devices; and
   receiving, via the interferometer, light reflected from the one of the first and second retro devices.

12. The method of claim 11, further comprising providing each of the first and second digital measuring devices with a second waveguide structure and a demultiplexer, the method further comprising, in each digital measuring device:
receiving, via the second waveguide structure, light from the laser source;
combining, via the second waveguide structure, the light from the laser source with the light reflected from the one of the first and second retro devices to produce the first or second measurement beam; and
splitting, via the demultiplexer, the first or second measurement beam into a plurality of channels spaced in frequency.

13. The method of claim 12, the method further comprising, in each digital measuring device, detecting an intensity value of each of the plurality of channels to measure a distance between the digital measuring device and the mirror.

14. The method of claim 13, the method further comprising using the distances between the first and second digital measuring devices and the mirror to determine the position of the mirror.

15. The method of claim 9, the method further comprising, in each digital measuring device, converting the first or second measurement beam into a plurality of channels spaced in frequency via a Fourier transform by sampling time domain intensity data of the first or second measurement beam at a frequency corresponding to at least one wavelength of light provided by the laser source.

16. The method of claim 15, further comprising, for each digital measuring device, calculating a distance between the digital measuring device and the mirror based on the time domain intensity data, a total number of channels spaced in frequency, and an error metric.

17. The method of claim 16, wherein, for each digital measuring device, the distance is calculated iteratively.

18. The method of claim 9, the method further comprising:
measuring a distance from the first digital measuring device to the mirror; and
measuring a distance from the second digital measuring device to the mirror.

19. The method of claim 18, further comprising determining the position of the mirror based on the distance from the first digital measuring device to the mirror and based on the distance from the second digital measuring device to the mirror.

20. The method of claim 9, wherein the position of the mirror is adjusted based on a pivot point located on an axis of the mirror.

* * * * *